(12) United States Patent
Makuta et al.

(10) Patent No.: US 10,022,897 B2
(45) Date of Patent: ***Jul. 17, 2018

(54) TRANSFER MOLDING METHOD, DIE STRUCTURE, TRANSFER MOLDING DEVICE, AND OPTICAL MEMBER

(71) Applicant: OMRON Corporation, Kyoto-shi, Kyoto (JP)

(72) Inventors: Isao Makuta, Saitama (JP); Koichi Takemura, Saitama (JP); Tomofusa Shibata, Saitama (JP); Yoshihisa Yamanaka, Shiga (JP); Norikazu Kitamura, Osaka (JP); Masayuki Shinohara, Kyoto (JP); Kazuhide Hirota, Shiga (JP); Toshikaga Taguchi, Shiga (JP); Masayuki Kojima, Saitama (JP); Yukihiro Takahashi, Kyoto (JP)

(73) Assignee: OMRON Corporation, Kyoto (JP)

( * ) Notice: Subject to any disclaimer, the term of this patent is extended or adjusted under 35 U.S.C. 154(b) by 360 days.

This patent is subject to a terminal disclaimer.

(21) Appl. No.: 14/440,644

(22) PCT Filed: Feb. 8, 2013

(86) PCT No.: PCT/JP2013/053101
§ 371 (c)(1),
(2) Date: May 5, 2015

(87) PCT Pub. No.: WO2014/069002
PCT Pub. Date: May 8, 2014

(65) Prior Publication Data
US 2015/0251341 A1 Sep. 10, 2015

(30) Foreign Application Priority Data
Nov. 5, 2012 (JP) ................................. 2012-244004

(51) Int. Cl.
*B29C 43/02* (2006.01)
*B29C 59/02* (2006.01)
(Continued)

(52) U.S. Cl.
CPC ............ *B29C 43/021* (2013.01); *B29C 59/02* (2013.01); *B44C 1/1712* (2013.01);
(Continued)

(58) Field of Classification Search
CPC .................................................... B29C 43/52
See application file for complete search history.

(56) References Cited

U.S. PATENT DOCUMENTS 4,304,751 A * 12/1981 Li ........................... B29C 35/16
264/322
6,464,367 B2 * 10/2002 Ito ........................ G02B 6/0031
362/23.16

(Continued)

FOREIGN PATENT DOCUMENTS

JP 2004-126922 A 4/2004
JP 2005-310286 A 11/2005
(Continued)

OTHER PUBLICATIONS

Shan et al., Sensors and Actuators A: Physical, 2005, vol. 119, Issue 2, pp. 433-400.*

(Continued)

*Primary Examiner* — Matthew J Daniels
*Assistant Examiner* — Kelsey C Grace
(74) *Attorney, Agent, or Firm* — Osha Liang LLP

(57) ABSTRACT

A die structure has a first die, a second die that comes in contact with and separate from the first die, a heating unit provided in at least one of the first and second dies, and a transfer member provided in at least one of the first and second dies that brings a resin sheet supplied between the first and second dies into contact with a transfer surface and carrying out transfer molding, and a recess site formed on the transfer member near the transfer surface.

8 Claims, 15 Drawing Sheets

(51) Int. Cl.
*B44C 1/17* (2006.01)
*F21V 8/00* (2006.01)
*B29L 11/00* (2006.01)

(52) U.S. Cl.
CPC ...... *G02B 6/0065* (2013.01); *B29C 2043/025* (2013.01); *B29C 2059/023* (2013.01); *B29L 2011/00* (2013.01); *B29L 2011/0016* (2013.01); *G02B 6/0036* (2013.01); *G02B 6/0038* (2013.01); *G02B 6/0046* (2013.01); *G02B 6/0053* (2013.01); *Y10T 428/24479* (2015.01)

(56) References Cited

U.S. PATENT DOCUMENTS

| | | | |
|---|---|---|---|
| 9,291,765 B2* | 3/2016 | Kim | G02B 6/0033 |
| 2003/0090887 A1* | 5/2003 | Igarashi | G02B 6/0018 362/617 |
| 2004/0098632 A1 | 5/2004 | Ueda | |

FOREIGN PATENT DOCUMENTS

| | | | |
|---|---|---|---|
| JP | 2011-048290 A | | 3/2011 |
| JP | 2011048290 A | * | 3/2011 |
| JP | 2012-244004 A | | 12/2012 |
| JP | 2014-091282 A | | 5/2014 |
| TW | 200305492 A | | 11/2003 |

OTHER PUBLICATIONS

Office Action issued in corresponding Taiwanese Application No. 10420463040, dated Apr. 13, 2015 (21 pages).
International Search Report issued in PCT/JP2013/053101 dated Mar. 19, 2013 (4 pages).
Written Opinion of the International Searching Authority issued in PCT/JP2013/053101 dated Mar. 19, 2013 (4 pages).

* cited by examiner

Fig. 5(a)
Fig. 5(b)
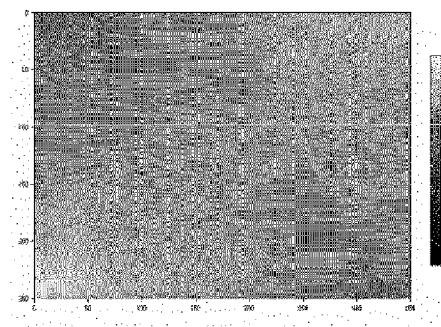
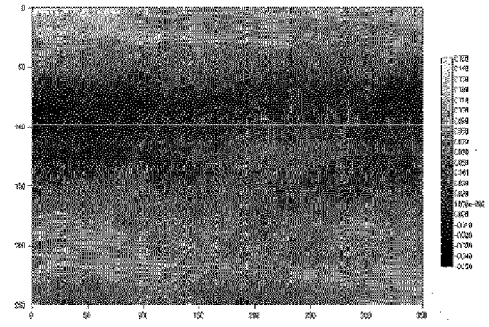
Fig. 5(c)
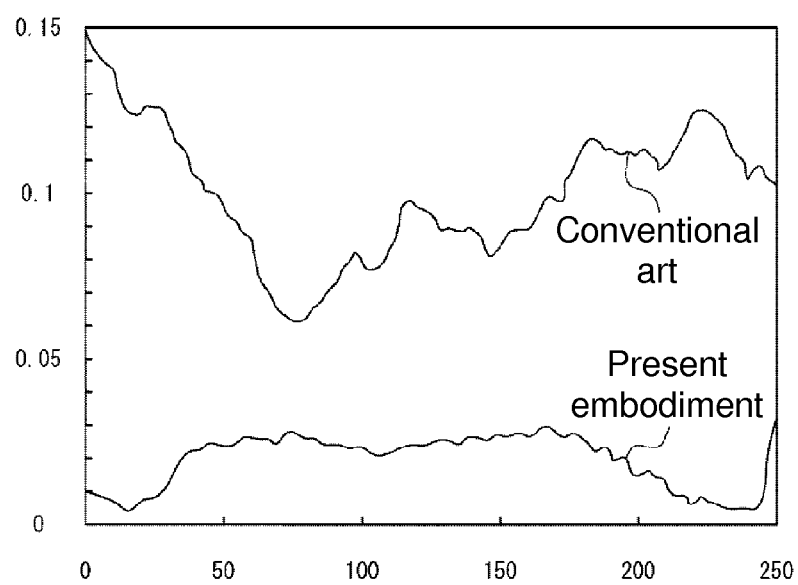

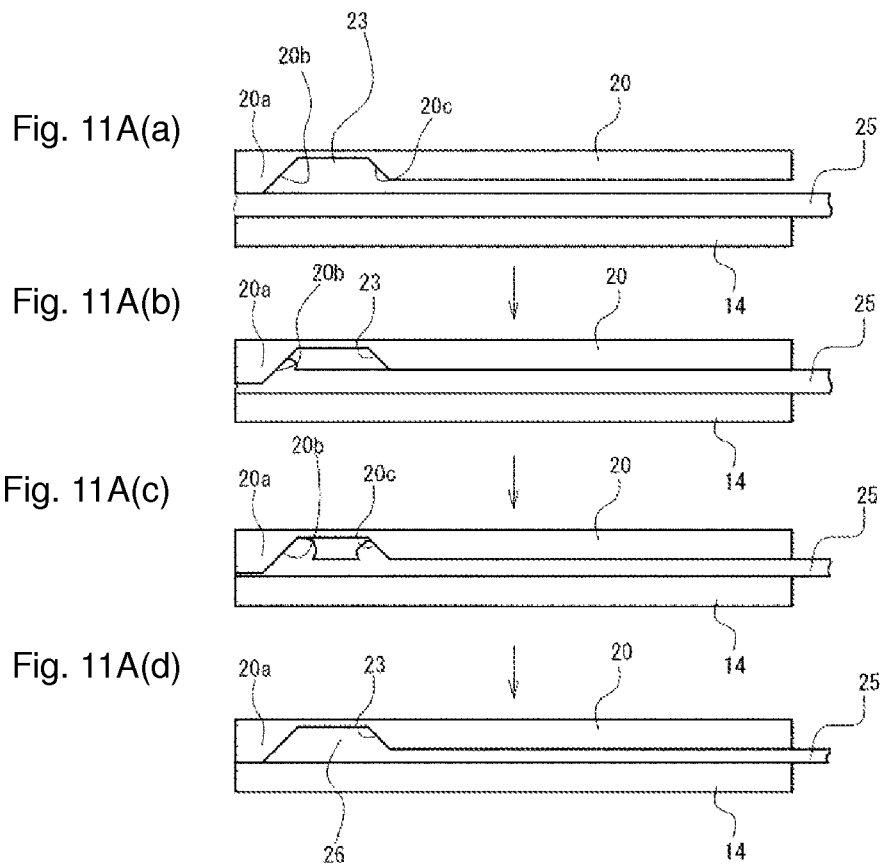
Fig. 11A(a)
Fig. 11A(b)
Fig. 11A(c)
Fig. 11A(d)
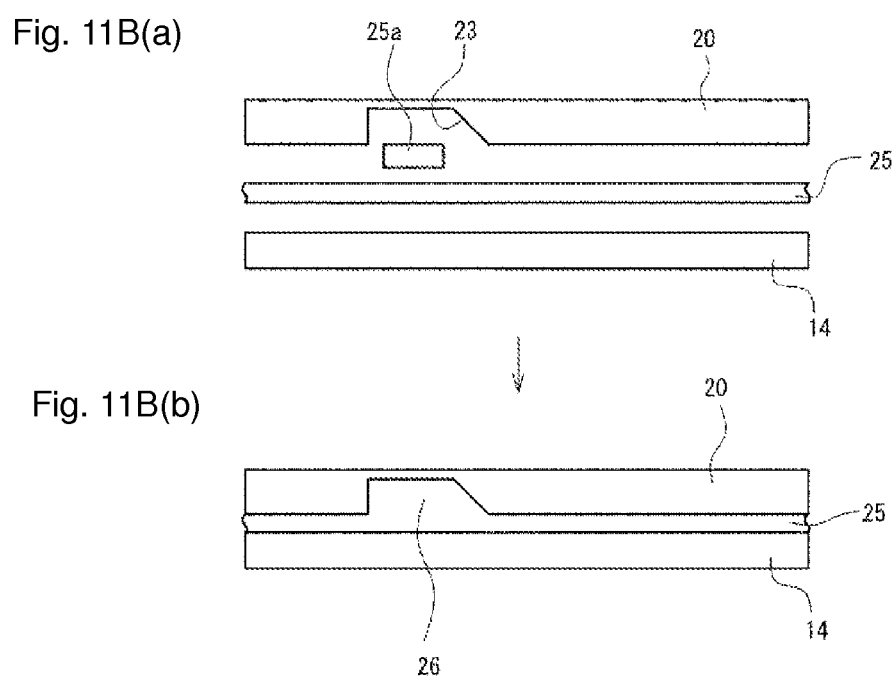
Fig. 11B(a)
Fig. 11B(b)

TRANSFER MOLDING METHOD, DIE STRUCTURE, TRANSFER MOLDING DEVICE, AND OPTICAL MEMBER

BACKGROUND

Technical Field

The present invention relates to a transfer molding method, a die structure, a transfer molding device, and an optical element.

Related Art

Conventionally, a transfer molding device heats and compresses a resin film using a transfer plate to transfer-mold fine recess and projection patterns onto the film, as is known from Japanese Unexamined Patent Application Publication No. 2005-310286, for example.

SUMMARY

However, for instance, the aforementioned conventional transfer molding device can only create a pattern of fine submicron recesses and projections on the outer surface of the resin film, and cannot simultaneously create a submillimeter structure.

One or more embodiments of the present invention transfers a pattern from the transfer surface to a resin film, while also creating a thick portion protruding greater than the maximum height of the recesses and projections on the transfer surface.

According to one or more embodiments of the present invention, a transfer molding method comprises transporting a resin sheet between a first die and a second die arranged facing each other where at least one of the surfaces on the dies facing each other includes a surface that is a transfer surface; clamping the resin sheet between the first and second dies with the transfer surface in contact with at least one surface of the resin sheet; applying heat to at least one of the first and second dies to transfer mold the transfer surface onto the at least one surfaces of the resin sheet, and forming a large thick portion protruding at a height greater than the maximum height of recesses and projections on the transfer surface using a recess site formed in at least one of the first and second dies.

Hereby, the transfer surface of the die is brought in contact with the resin sheet during the clamping step; therefore the transfer surface is easily transferred to the outer surface of the resin sheet during the transfer molding step. Additionally, because a recess site is created on the die, a large thick portion can be simultaneously created that protrudes greater than the maximum height of the recesses and projections on the transfer surface.

According to one or more embodiments of the present invention, the transfer molding step may further include bringing the first and second dies near a position that reduces the thickness of portions on the molded resin sheet other than the thick portion to less than the initial thickness thereof.

This facilitates processing the resin sheet to within a desired thickness. Hereby, the transfer surface of the die is brought in contact with the resin sheet during the clamping step; therefore the transfer surface is easily transferred to the outer surface of the resin sheet during the transfer molding step.

According to one or more embodiments of the present invention, the height of the thick portion on the molded resin sheet may be no less than ten times the maximum height of the recesses and projections on the surface molded using the transfer surface in the transfer molding step.

According to one or more embodiments of the present invention, the resin sheet may be heated to no less than the glass transition temperature during the transfer molding step.

According to one or more embodiments of the present invention, the resin sheet may be melted and flowed towards the recess site formed in the transfer surface in the transfer molding step.

Hereby, the resin sheet itself need not have any special composition, and further, a thick portion of a different order may be easily created without needing separate materials.

According to one or more embodiments of the present invention, the resin flowed into the recess site formed in at least one of the first and second dies may be the resin from the outer surface of the melted resin sheet.

Hereby, resin material may flow uniformly from the entire outer surface portion of the resin sheet to the recess site, allowing an overall effortless molding process.

According to one or more embodiments of the present invention, the resin flowing into the recess site formed in at least one of the first and second dies may be obtained from a region adjacent to a region whereon a product is placed on the molded resin sheet.

Hereby, the region to be cut can be effectively used thereafter to form the thick portion.

According to one or more embodiments of the present invention, an additional material may be disposed within the recess site in the aforementioned transfer molding step and melted along with at least a portion of the resin sheet to form the thick portion.

Hereby, the resin sheet is melted and the thick portion created effortlessly because the melted resin portion does not need to be moved.

According to one or more embodiments of the present invention, the resin sheet includes at least a protruding portion on at least one part thereof; and at least the protruding portion may be melted to form the thick portion during the transfer molding step.

Hereby, the inconvenience of providing the additional material may be omitted thus allowing for an efficient molding process.

One or more embodiments of the present invention transfers a transfer surface to a resin sheet and forms a largely protruding thick portion with an order different from the fineness of the outer surface on the transfer surface using a recess site formed on a die.

BRIEF DESCRIPTION OF THE DRAWINGS

FIG. 5(a) is a picture illustrating an illumination state in a light guide plate produced according to the first embodiment; FIG. 5(b) is a picture illustrating an illumination state in a conventional light guide plate; and FIG. 5(c) is a graph illustrating transmitted light intensities for the light guide plates in FIGS. 5(a) and 5(b).

FIG. 7B(b) is a graph illustrating changes in the residual stress accompanying the temperature deformation of the resin sheet;

FIGS. 11A(a)-11A(d) are schematic explanatory diagrams for illustrating a method of forming the thick portion on the resin sheet according to another embodiment;

FIGS. 11B(a)-11B(b) are schematic explanatory diagrams for illustrating a method of forming the thick portion on the resin sheet according to another embodiment;

DETAILED DESCRIPTION

Embodiments of the present invention are described below with reference to the attached drawings. In embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention. Note that while terms representing specific directions and positions (such as, terms including "up", "down", "side", and "end") are used in the following description, the use of these terms are merely for facilitating an understanding of the invention with reference to the drawings. The meanings of these terms are not intended to limit the technical scope of the present invention. The following description is nothing more than an example, and is not intended to limit the present invention, where the invention is to be adopted, or how the invention is to be used.

First Embodiment

Configuration

Figure 1:
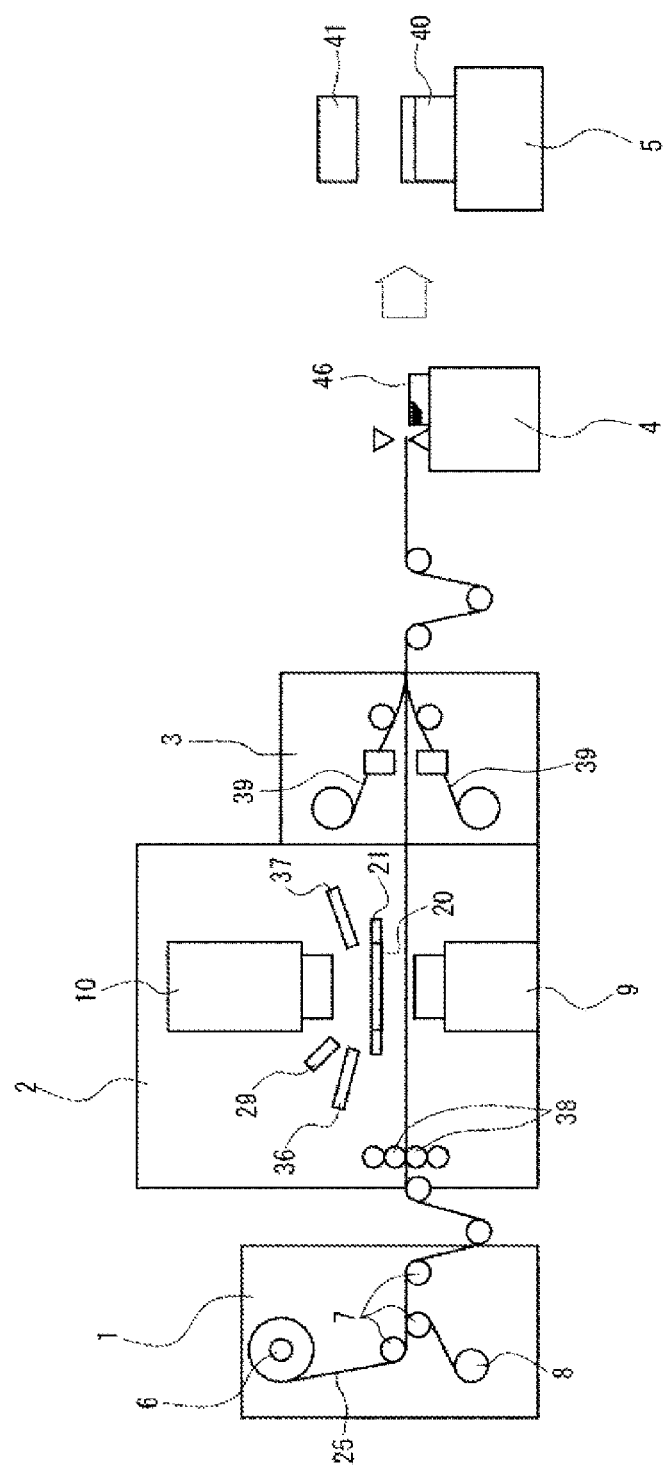
FIG. 1 is a schematic front view illustrating a light guide plate molding device according to a first embodiment.

FIG. 1 is a schematic front view illustrating a light guide plate molding device according to the first embodiment. The light guide plate molding device is provided with a material supply device 1, a transfer molding device 2, a film adherence device 3, a cutting device 4, and an outer machining device 5.

The material supply device 1 unwinds the resin sheet 25 from a main roller 6 onto which the resin sheet 25 is wound supplying the resin sheet 25 to the transfer molding device 2. A plurality of rollers 7 are arranged throughout the device, and a protective sheet adhered to the resin sheet 25 is removed therefrom and wound onto a winding roller 8 immediately after passing the second roller 7. Here, a polycarbonate (melting point at approximately 240° C., and glass transition temperature at approximately 150° C.) is used for the resin sheet 25.

Figure 2:
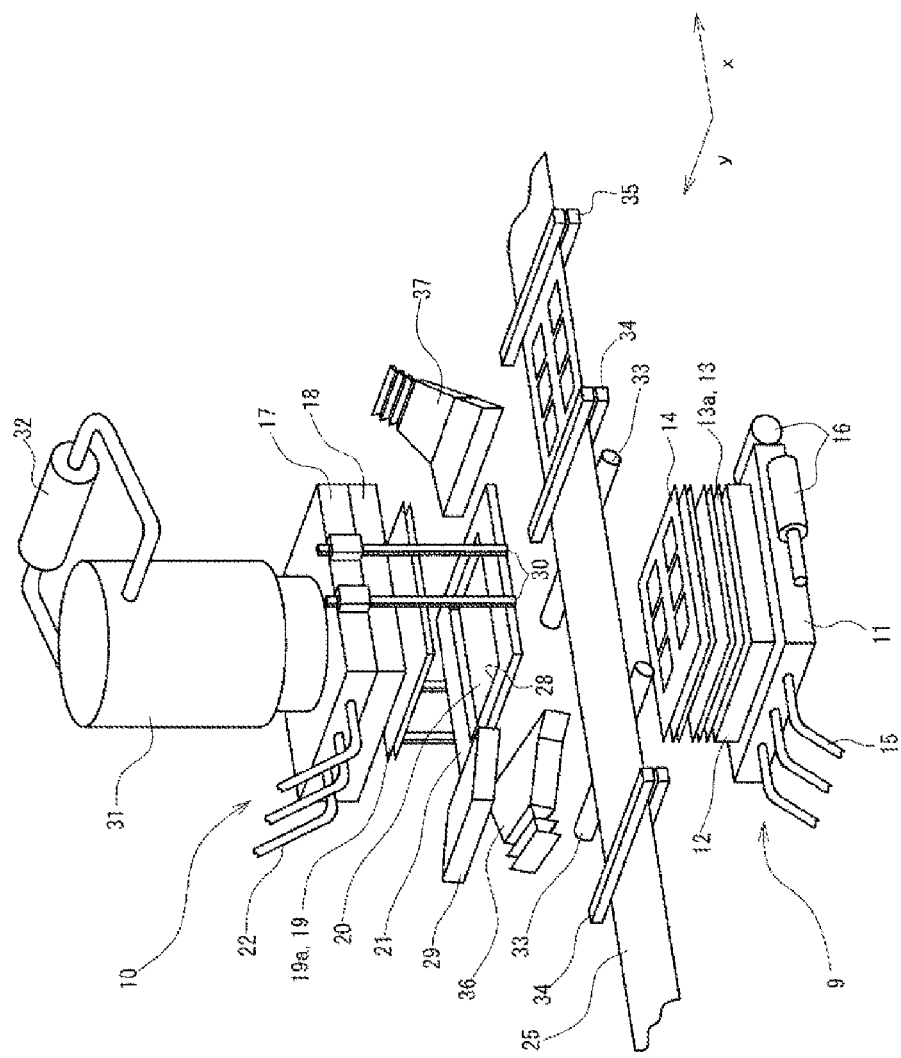
FIG. 2 is a partial exploded perspective view schematically illustrating the transfer molding device in FIG. 1.

As illustrated in FIG. 2, the transfer molding device 2 is provided with a lower die 9 and an upper die 10.

The lower die 9 is configured from a lower die mediating plate 12, a lower die insulating plate 13, and a lower die transfer plate 14 arranged in that order on the upper surface of a lower die support plate 11.

The lower die support plate 11 is a stainless steel plane rectangle sheet. A plurality of through holes is formed through both sides of the lower die support plate 11 though which heaters 15 and electrically insulating elements (not shown) are inserted. Energizing the heaters 15 thereby heats the lower die support plate 11 and through the lower die mediating plate 12 and lower die insulating plate 13 increases the temperature of the lower die transfer plate 14. Here, the heating temperature of the lower die support plate 11 through energization of the heater 15 is kept at approximately 180° C.

Similar to the lower die support plate 11, the lower die mediating plate 12 is a stainless steel plane rectangle sheet.

The lower die insulating plate 13 is a plurality of polyimide resin insulating sheets 13a laminated together into a single body (FIG. 2 illustrates the plate separated in the vertical direction). The insulating ability of the insulating sheet can be adjusted in accordance with differing numbers of sheets in the laminate. Here, configuring the lower die insulating plate 13 with five insulating sheets thereby maintains a temperature of 150° C. in the lower die transfer plate 14 relative to the heating temperature of 180° C. in the lower die support plate 11. The configuration thus prevents deformation of the resin sheet 25 due to the heat effect from the lower die support plate 11. Accordingly, the lower die 9 can be kept close to the line transporting the resin sheet 25, thus reducing the size of the transfer molding device 2 because a large distance is not required when releasing the die. The lower die insulating plate 13 also functions to prevent heat from escaping from the upper die 10 to the lower die insulating plate 13 when heating the resin sheet 25 after the die (die) is closed. Finally, the lower die insulating plate 13 also functions to prevent the lower die support plate 11 from cooling down when cooling the resin sheet 25.

The lower die transfer plate 14 is a plane rectangular sheet made of nickel chromium alloy. A plurality of half-spherical submicron depressions is distributed at arbitrary intervals in the X- and Y-axis directions on the upper surface of the lower die transfer plate 14, thereby creating the transfer surface. Consequently, the transfer surface can create a plurality of half-spherical protrusions on the lower surface of the resin sheet 25 receiving the transfer pattern. The surface on which the protrusions are formed becomes a reflective surface that reflects light from a light source toward the upper surface so that the light is output from the upper surface. Note that the aforementioned depressions are not limited to being half-spherical, and may be, for instance various other types of dents such as cones, and the like. Additionally, bumps may be formed on the transfer surface instead of dents.

The aforementioned lower die 9 is movable in the X-axis and Y-axis direction in a horizontal plane using drive means such as a servo motor (not shown). The displacement of the lower die 9 may be detected using a micrometer 16, and minute adjustments made to the position of the lower die 9 in the X-axis and Y-axis directions within the plane on the basis of the detection results. The lower die may also be moved manually.

The upper die 10 is configured from an upper die mediating plate 18, an upper die insulating plate 19, and a retaining plate 21 that holds an upper die transfer plate 20 arranged in that order on the upper surface of an upper die support plate 17.

Similar to the aforementioned lower die support plate 11, the upper die support plate 17 is a plane rectangular sheet made of stainless steel (SUS). A plurality of through holes is formed through both sides of the upper die support plate 17 though which heaters 22 and electrically insulating elements (not shown) are inserted. The temperature of the upper die support plate 17 can be raised up to 280° C. by energizing the heaters 22.

Similar to the aforementioned upper die support plate 17, the upper die mediating plate 18 is a plane rectangular sheet made of stainless steel (SUS).

Similar to the lower die insulating plate 13, the upper die insulating plate 19 is a laminate of a plurality of insulating sheets 19a made of a resin material such as polyimide. Here the upper die insulating plate 19 is made from two insulating sheets, and the temperature at the upper die transfer plate 20 is kept to approximated 240° C. Thus, the resin sheet 25 melts sufficiently when clamped between the upper die 10 and the lower die 9.

Figure 3A:
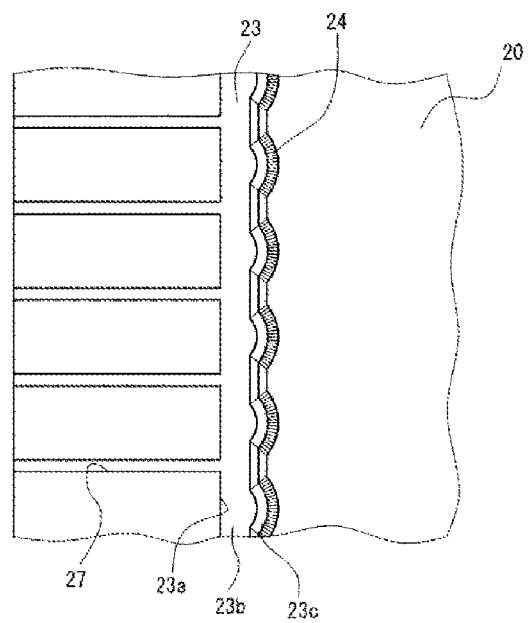
FIG. 3(a) is a partial plan view of an upper die transfer plate in FIG. 2.
Figure 3B:
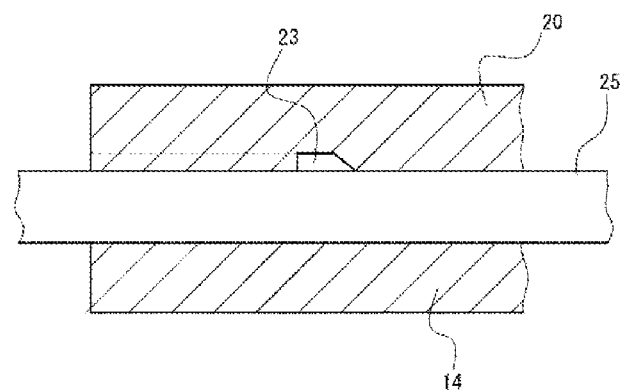
FIG. 3(b) is a partial schematic cross-sectional view of the die portion in FIG. 2.
Figure 3C:
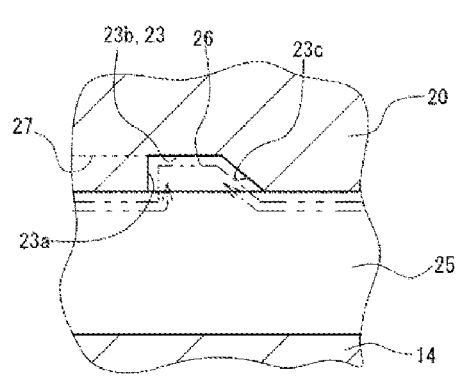
FIG. 3(c) is a partial exploded view thereof.

Similar to the aforementioned lower die transfer plate 14, the upper die transfer plate 20 is a plane rectangular sheet made of a nickel chromium alloy. As illustrated in FIGS. 3(a), 3(b), and 3(c), a recess site is formed in the lower surface of the upper die transfer plate 20 extending in the width direction thereof. As illustrated in FIG. 3(c), the recess site 23 is a space surrounded by a vertical surface 23a, a bottom surface 23, a slanted surface 23c, and end surfaces (not shown). The slanted surface 23c includes a plurality of arc regions 24 arranged in a row in the width direction. Each arc region 24 includes a plurality of projecting rays (not shown) arranged circumferentially with substantially triangular cross-sections extending radially.

The recess site 23 is configured so that a portion of the melted resin sheet 25 flows therein to form a thick portion 26. Here a resin sheet 25 is an extremely thin film-like material, and in the type used in the first embodiment is 0.2 mm to 0.3 mm, or may include a thicker material. The height of the thick portion is within the submillimeter range; here, the height is 0.2 mm. The height of the protruding rays (roughness on the outer surface) formed in the inclined surface is also in the submicron range; here, the height is 0.2 μm. The transfer surface is the region including the projecting rays. In addition, a plurality of light sources is arranged near the end surface of the thick portion 26. The projecting rays bends the light from the plurality of light sources, thus preventing the light from leaking from the slanted surface.

A plurality of grooves 27 is formed extending from the aforementioned recess site 23 up to the side surface in the lower surface of the upper die transfer plate 20. According to one or more embodiments of the present invention, each groove 27 is formed in a direction orthogonal (X-axis direction) to the width direction (Y-axis direction) in which the recess site 23 extends. This allows the shortest length for the groove 27. Additionally, each groove 27 is located in between the arc regions 24. This is because the melted resin flows slowest between the arc regions 24, and thus conceivably it is easier for bubbles to remain in the resin. Therefore, the air bubbles can be effectively discharged from the recess site. Each groove 27 may also be made the same depth or deeper than the recess site 23; in this case, the grooves 27 are created at the same depth as the recess site 23. The width of each groove 27 may be configured to allow the grooves to maintain the flow rate of the melted resin (resin sheet 25) entering the recess site 23 at the required minimum while ensuring that no bubbles remain inside the recess site 23.

In this manner, the grooves 27 which extend from the recess site 23 to outside the structure are formed between the arc regions 24 and thereby facilitates guiding the air inside the recess site 23 to the outside when the melted resin flows therein. Not only that, a portion of the resin flowing into the recess site 23 also flows into the grooves 27. Given that the grooves 27 are the same depth or deeper than the recess site 23, no air will remain in the region from the recess site 23 up to the grooves 27. However, if the grooves 27 are shallower than the recess site 23, and angled portion is formed thereat, creating the possibility that the air will remain in the angled portion. Therefore, when the grooves 27 are the same depth or deeper than the recess site 23 no air remains in the recess site 23, and no voids are created in the thick portion 26. Additionally, even if air does remain in the recess site 23, only a little remains therein, so the resin does not burn. Moreover, adding pressure allows the resin to melt without creating voids in the melting resin.

As illustrated in FIG. 2, the retaining plate 21 is plane rectangular sheet made from stainless steel (SUS) with an opening 28 formed at the center. The retaining plate 21 holds the upper die transfer plate 20 underneath, and exposes the upper part of the upper die transfer plate 20 through the opening 28. The upper surface of the upper die transfer plate 20, which is exposed through the opening 28, is irradiated with soft X-rays from a soft X-ray radiation device 29. The resin sheet 25 is thereby made electrostatically neutral, thus preventing the surrounding dust and the like from sticking to the resin sheet due to electrostatic attraction. Rods 30 extend from both end portions of the retaining plate 21. The rods may be raised and lowered separately from the raising and lowering of the entire upper die through driving of a drive means such as a cylinder and the like (not shown).

A press 31 arranged near the upper surface of the upper die support plate 17 is used to raise and lower the upper die. An air supply device 32 supplies and discharges air to and from the press 31. The raising and lowering of the rods 30 (not shown) raises and lowers the entire upper die 10 via the upper die support plate 17.

The resin sheet 25 is transported between the aforementioned upper and lower dies 10, 11 via the aforementioned material supply device 1. A support roller 33, and a positioning gripper 34 are arranged in that order from near the inlet and the outlet of the die partway along the transport route for the resin sheet 25. The support roller 33 supports the lower surface of the resin sheet 25, while the positioning gripper 34 clamps the resin sheet 25 from above and below for positioning purposes. The support roller 33 and the positioning gripper 34 can be raised and lowered. A transport gripper 35 is also arranged downstream along the transport route. Similar to the positioning gripper 34, the transport gripper 35 clamps the resin sheet 25 and travels back and forth along the transport route via a drive means (not shown). The transport gripper 35 may clamp the resin sheet 25 while the positioning gripper 34 is released and moved downstream along the transport route by the transport gripper 34 to convey the resin sheet 25. The operations of the support roller 33 and the grippers are described later.

An air supply duct 36 is additionally arranged upstream and above the mold, with an air discharge duct 37 arranged downstream and above the mold. The air supply duct 36 blows out air supplied from a compressor and the like (not shown). The air is blown from diagonally above a resin sheet 25 positioned between the upper and lower dies 9, 10. The air discharge duct 37 intakes air via a compressor and the like (not shown), collecting the air blown onto the resin sheet 25 by the air supply duct 36. The air supply duct 36 provides purified air, and the flow of air formed from the air supply duct 36 to the air discharge duct 37 not only cools the resin sheet 25, but also forms a so-called air barrier that prevents dust, and the like from sticking to the outer surface of the resin sheet 25. Additionally, dust, and the like will not stick to the resin sheet 25 due to electrostatic attraction because the resin sheet 25 is made electrostatically neutral due to being irradiated by soft X-rays.

As illustrated in FIG. 1, adhesive rollers 38 come in contact with the upper and lower surfaces of the resin sheet 25 respectively upstream of the mold. Rotating the adhesive rollers 38 transports the resin sheet 25 while removing dust, and the like adhered to the outer surface of the resin sheet 25.

The film adherence device 3 sticks a protective film 39 on the upper and lower surfaces of the molded resin sheet 25. The protective film 39 prevents damage to the resin sheet 25 from other objects impacting the sheet, or prevents dust from sticking to the resin sheet 25.

The cutting device 4 separates the molded resin sheet 25 into strips. The surrounding four sides of the resin sheet 25 separated by the cutting device 4 are cut with a die-cutting device (not shown) to create a half-finished plate 46. The thick portion 26 and a machining allowance remain on the half-finished plate 46; the machining allowance is the end surface opposite the thick portion that should be removed.

Figure 4A:
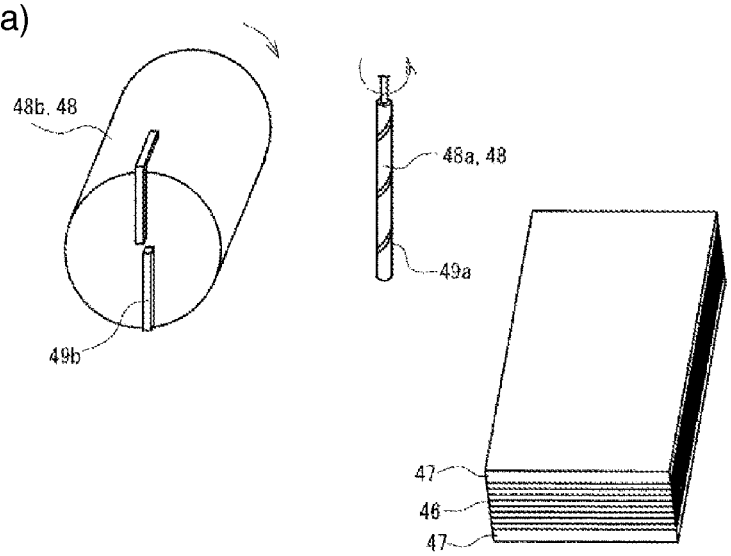
FIG. 4(a) is an explanatory diagram for illustrating the relationship between a half-finished plate and a first and second cutting tool.

The milling device 5 is provided with a cutter 41 for removing both end surfaces (the thick portion 26, and the opposite side surface) of the half-finished plate 46. The cutter 41 includes a first cutting tool 48a and a second cutting tool 48b as illustrated in FIG. 4(a). Each of the cutting tools 48a, 48b are rotationally driven by a driving means (not shown). The first cutting tool 48a is a cylindrical object used for rough shaping. Cutting blades 49a are formed at symmetrical locations about the center of the rotation axis on the outer surface of the first cutting tool 48a. The second cutting tool 48b is a circular disc used for mirror finishing, with notches formed at two symmetrical positions on the outer edges thereof; Cutting blades 49b extend radially along the outer surface of the second cutting tool 48b. Note that specific examples of cutting methods using the cutter 41 are described later.

Operations

Next, the operations of a light guide plate molding apparatus configured as related above are described.

Preparation

The upper die 10 is raised, releasing the die and the transport gripper 35 clamps the end portion of the resin sheet 25 being supplied from the material supply device 1. After moving the transport gripper 35, the resin sheet 25 is clamped by the positioning gripper 34 to move the resin sheet 25 into a region where the upper and lower dies 9, 10 are facing each other.

The heater 15 is energized in advance to heat the mold. As previously described, the insulating plates are each placed in between other plates, and therefore in the upper die 10, the upper die transfer plate 20 heats up to roughly 240° C., and in the lower die 9, the lower die transfer plate 14 heats up to roughly 150° C. The upper surface of the resin sheet 25, which is located close to the lower die 9, is kept at roughly a glass transition temperature. Therefore, no defects will be generated, such as the heat (preheating step) affecting the resin sheet 25, causing the resin sheet 25 to sink downward and touch the lower die transfer plate 14.

Transfer Molding Process

Here, the support rollers 33 and the positioning gripper 34 are lowered to thereby place the resin sheets 25 on the lower die transfer plate 14 of the lower die 9. Additionally, the press 31 is driven to lower the upper die 10, bringing the transfer surface of the upper die transfer plate 20 in contact with the resin sheet 25. At this point, the pressure acting due to the press 31 is kept low, to lightly clamp the resin sheet 25 between the dies. Hereby, the resin sheet 25 is heated, removing the water contained in the outer layers thereof (preheating step).

Once a predetermined amount of time passes after starting the preheating step (a first allotted time), the pressure from the press 31 increases. As previously described, a polycarbonate (melting point at approximately 250° C., and glass transition temperature at approximately 150° C.) is used for the resin sheet 25. Because the temperature of the upper die transfer plate 20 is raised to 240° C., the resin sheet 25 exceeds the melting temperature to come to a molten state. While the lower die transfer plate 14 is that a temperature of 180° C. in the lower die 9, heat will not escape from the lower die because of the lower die insulating plate 13 arranged therein. Therefore, the entire region on the resin sheet 25 clamped by the dies exceeds the melting temperature to come to a molten state (heating and compression process).

The upper die 10 adds pressure through the press 31. Consequently, the thickness of the portion of the resin sheet 25 clamped between the dies is reduced, and a portion of the resin sheet 25 (upper surface portion) flows into the recess site 23 formed in the upper die transfer plate 20. When the melted resin flows into the recess site, the air within the recess portion 23 is discharged outside via the grooves 27. The melted resin completely fails the recess site 23 and a portion thereof flows towards the grooves 27. The depth of the grooves 27 is formed at no less than the debts of the recess site 23 (and in the first embodiment they are the same). Thus, no air remains in the recess site 23, and the air is discharged smoothly to the outside. Additionally, issues such as burning and the like do not occur because there is no air compression taking place inside the recess sites 23. Moreover, even if some small amount of air were to remain in the recessed site 23, because an ample amount of pressure is added to the site, the resin may be properly melted without any voids being generated in the melted resin.

Once a predetermined amount of time passes after starting the heating and compression process (a second allotted time), the upper die 10 is raised. However, the upper die transfer plate 20 may be kept in contact with the resin sheet 25 by operating a cylinder. Here, the upper dye transfer plate 20 is provided with air through the air supply duct 36. The heated upper die support plate 17 is far away from the resin sheet 25, and air is taken into the upper dye transfer plate 20 from the air supply duct 36. In other words, the resin sheet 25 may be cooled through just the upper die transfer plate 20. Accordingly, heat from the upper die support plate 17 does not affect the cooling of the resin sheets 25, and therefore the resin sheet 25 may be effectively cooled in a short time. That is, the resin sheet 25 may be cooled to under 150° C., which is the glass transition temperature for the polycarbonate used in the resin sheet 25, in a short time. In this case, the upper die support plate 17 and the upper die mediating plate 18 are not cool, and therefore reduce the energy loss, and allow starting the subsequent transfer molding process quickly.

Once a predetermined amount of time passes after starting the cooling step (a third allotted time), that is when cooling solidifies the melted resin and produces a stable shape, the upper die transfer plate 20 is raised, releasing the molded portion of the resin sheet 25 from the die. In addition, the support roller 33 is raised, and the molded portion of the resin sheet 25 also released from the lower die transfer plate 14. Hereby, the thick portion 26 is formed on the upper surface of the resin sheet 25 where the height is in the submicron range; namely, the height of the thick portion 26 is 0.2 mm. A plurality of submicron saw-tooth projecting rays is formed on the slanted surface on the thick portion 26. The saw-tooth projecting rays are roughly 14 μm. In contrast, a plurality of half-circular protrusions is formed on the lower surface of the resin sheet 25 at constant intervals in the X- and Y-directions (die releasing process).

Conventionally, submicron protrusions and the like may be formed on the resin sheets 25 using transfer molding; however, it is impossible to simultaneously create a submillimeter thick portion 26. Using a transfer molding device 2 having the aforementioned die structure makes it possible to create the submicron protrusions and the like, and to simultaneously create the submillimeter thick portion 26 on the resin sheet 25. Additionally, in the aforementioned transfer molding method there are no internal stresses remaining in the half finished plates 46 obtained by melting and then hardening the resin sheet because the entire resin sheet 25 is melted while clamped between the upper and lower dies. Thus, a plurality of LEDs may be arranged on at the end surface of the thick portion 26 such that when light passes through the thick portion 26, imbalances and the like are eliminated from the light, and the light illuminates the entire upper surface of the light guide except for the thick portion 26 evenly.

Film Adherence Process

The resin sheet 25 molded by the transfer molding device 2 is transported further downstream where a protective film 39 is adhered to the upper and lower surfaces thereof by a film adherence device 3. The protective film 39 prevents cracks and scratches due to other components impacting the half-finished plate 46, and also prevents defects arising from the surrounding dust and the like sticking to the half-finished plate 46. Further, the protective film 39 is removed while assembling the liquid crystal panel after the half-finished plate 46 undergoes subsequent processes to produce the light guide plate.

Cutting Process

The resin sheet 25 with the protective film of 39 adhered to the upper and lower surfaces thereof is transported further downstream where the cutting device 4 cuts each half-finished plates into strips along the transport direction. The half-finished plate 46 includes the thick portion 26 and a machining allowance at the end surface (machining surface) opposite the thick portion that is removed during the milling process. At that point, the first cutting tool 48a (later described) creates a tapered surface 46a on the machining surface of the half-finish plate 46 at a corner along the cutting direction. Here, the tapered surface 46a forms an angle of roughly 3° with the cutting surface; the tapered surface 46a is created so that the tapered portion remains after the machining allowance is removed.

Milling Process

The half-finished plates 46 obtained after the cutting process are arranged such that the thick portions 26 are positioned opposite each other, and arranged for instance in a stack of eight. The stacked half-finished plates 46 have dummy plates 47 arranged at the upper and lower surfaces of the stack respectively.

Next the first cutting tool 48a, and subsequently the second cutting tool 48b cut one end surface of the half-finished plates 46 and the dummy plates 47.

As illustrated in FIG. 4(a), the first cutting tool 48a is arranged such that the rotation axis is parallel to the machining surface of the half-finished plates 46. The first cutting tool 48a rotates clockwise in the drawing while the outer peripheral cutting blade cuts the end surface of the half-finished plates 46. In this case, the half finished plates 46 are stacked and are sandwiched between the dummy plates 47. Therefore, this suppresses noise and the like, and facilitates the cutting of the half-finished plates. The first cutting tool 48a also creates a tapered surface 46a at a corner on the half-finish plates 46 along the cutting direction. Moreover, the tapered surface 46a is larger than the machining allowance on the machining surface of the half-finished plates 46. Consequently, the first cutting tool 48a creates a burr at the corner of the half-finished plates 46.

Figure 4B:
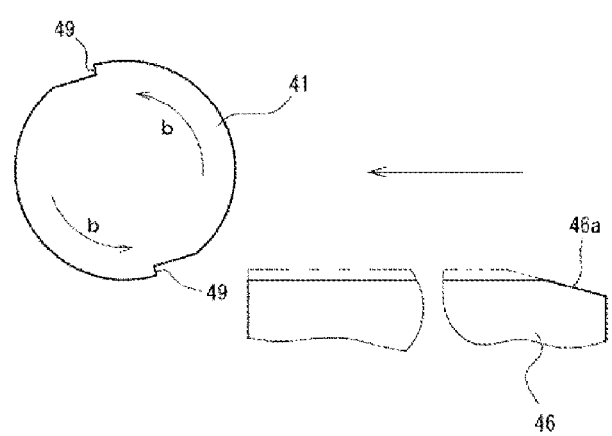
FIG. 4(b) and FIG. 4(c) are explanatory diagrams for illustrating the relationship between the half-finished plate and the first cutting tool.
Figure 4C:
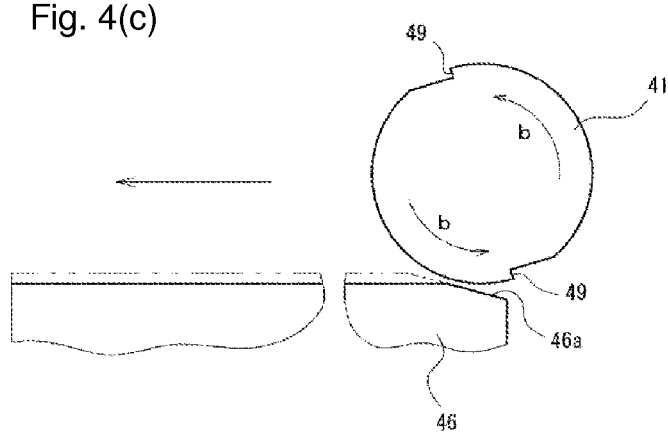

As illustrated in FIG. 4(b), the second cutting tool 48b is arranged such that the rotation axis is orthogonal to the machining surface of the half finished plates. The cutting blade on the outer surface of the second cutting tool 48b creates a mirrored finish on the machining surface. The cutting blades rotate while cutting the machining surface of the stacked half-finished plates 46. Therefore, if there were no dummy plates 47 on both the upper and lower surfaces then burrs would be created on upper and lower edges of the half-finished plates 46 positioned at the top and bottom. However, in this case dummy plates 47 are created are arranged at the upper and lower surfaces. Therefore, even if generated, the burrs are created at the location of the dummy plates 47, and not the half-finished plates 46.

The light guide plate produced in this manner contains a thin portion, 0.2 mm thick, and a thick portion, 0.5 mm thick having a substantially trapezoidal cross-section. The bottom surface of the light guide plate includes a plurality of half circle recesses (or protrusions) formed thereon. The light guide plate is assembled with other components in the following manner as a part of a liquid crystal display device.

Figure 11C:
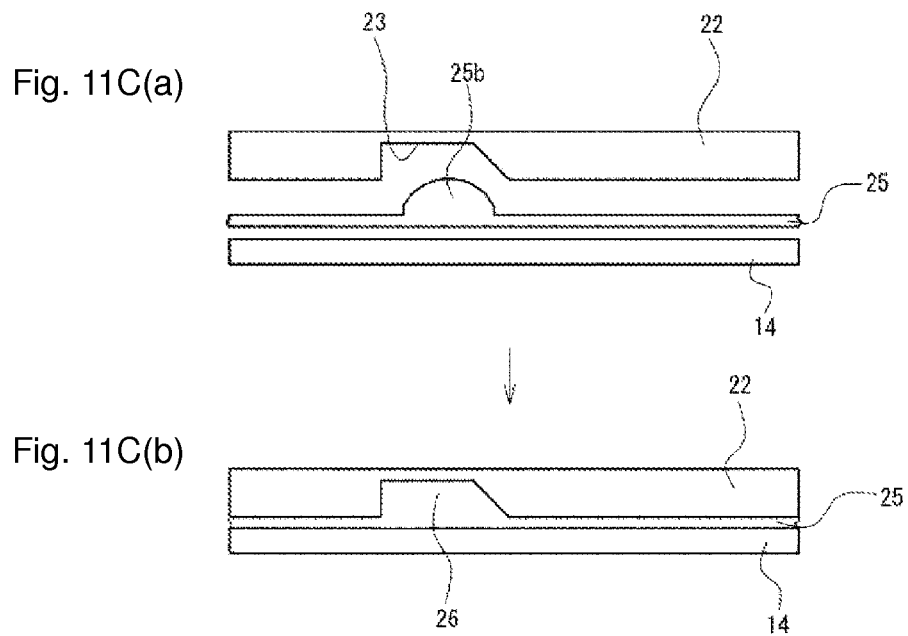
FIGS. 11C(a)-11C(b) are schematic explanatory diagrams for illustrating a method of forming the thick portion on the resin sheet according to another embodiment.
Figure 11D:
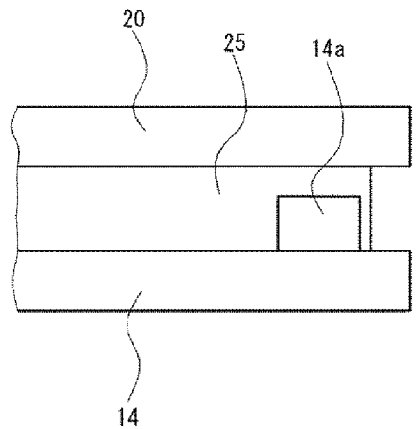
FIGS. 11D(a)-11D(d) are partial schematic cross-sectional views illustrating a transfer plate and the resin sheet according to another embodiment.
Figure 11D:
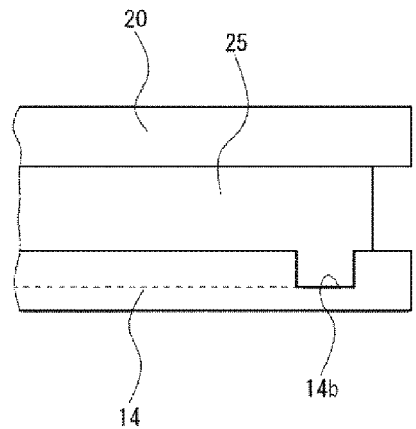
Figure 11D:
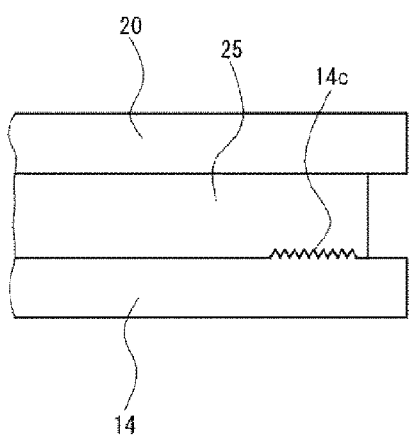
Figure 11D:
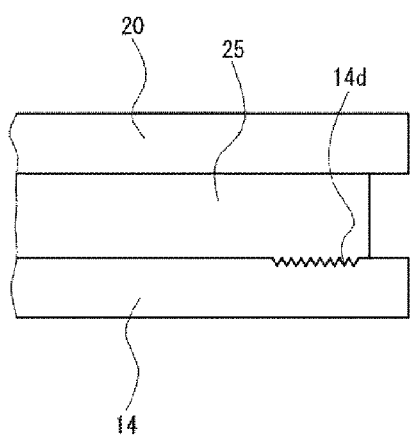
Figure 11E:
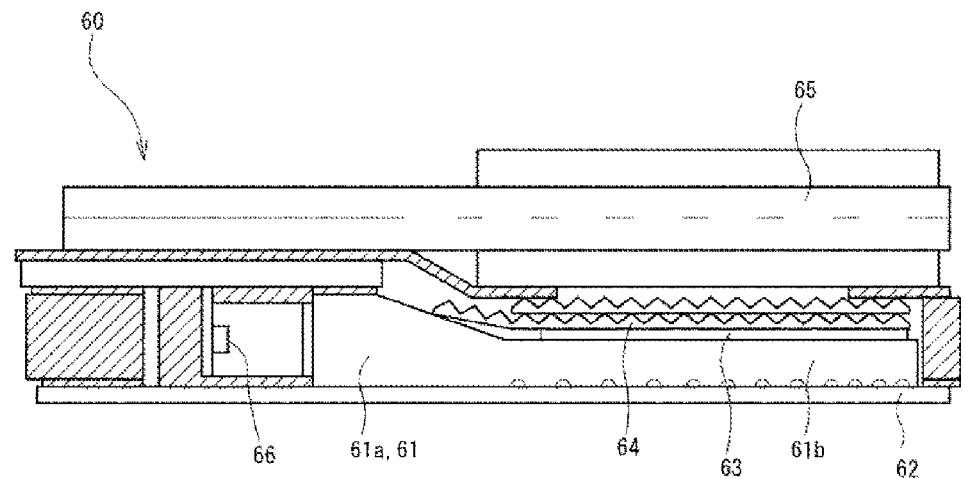
FIG. 11E is a cross-sectional view of a liquid crystal display device adopting a light guide plate according to the first embodiment.

Namely, as illustrated in FIG. 11E, the light guide plate 61 is mounted on the upper surface of a base 62. A diffusion plate 63, a prismatic sheet 64, and a liquid crystal panel 65 are layered in that order on the upper surface of the light guide plate 61. Furthermore, an LED 66, which is the light source, is arranged laterally along the orthogonal surface of the thick portion 61a. The liquid crystal display device is thereby completed.

In the assembled liquid crystal display device 60, the projecting rays in the thick portion 61a prevent the light from the LED 66 irradiating the light guide plate from leaking externally while guiding the light towards the thin portion 61b. Further, the half spherical recesses on the bottom surface of the light guide plate diffuses the light evenly so that the light illuminates the liquid crystal panel 65 by way of the diffusion plate 63 and the prismatic sheet 64.

Naturally, the light guide plate may also be used as simply a surface illumination device without being provided in the liquid crystal panel 65.

Here, the state of the aforementioned light guide plate with a plurality of refractive areas is described. As previously mentioned, the entire surface of the resin sheet 25 is melted while clamped between the dies during the transfer molding process. Therefore, there is no internal stress remaining in the product obtained, and the structure is uniform. Accordingly, as illustrated in FIG. 5(*a*), light may be uniformly output from the entire upper surface of the product. In contrast, as illustrated in FIG. 5(*b*), there is some unevenness in the output from the upper surface of the conventional light guide plate. FIG. 5(*c*) is a graph illustrating the differences in transmission light intensity of the P-polarized and the S-polarized light in the conventional light guide plate, and a light guide plate according to the first embodiment. As is clear from the graph, compared to the conventional light guide plate, to a large extent the differences in the transmitted light intensities in the light guide plate according to the first embodiment is kept small.

Second Embodiment

Figure 6:
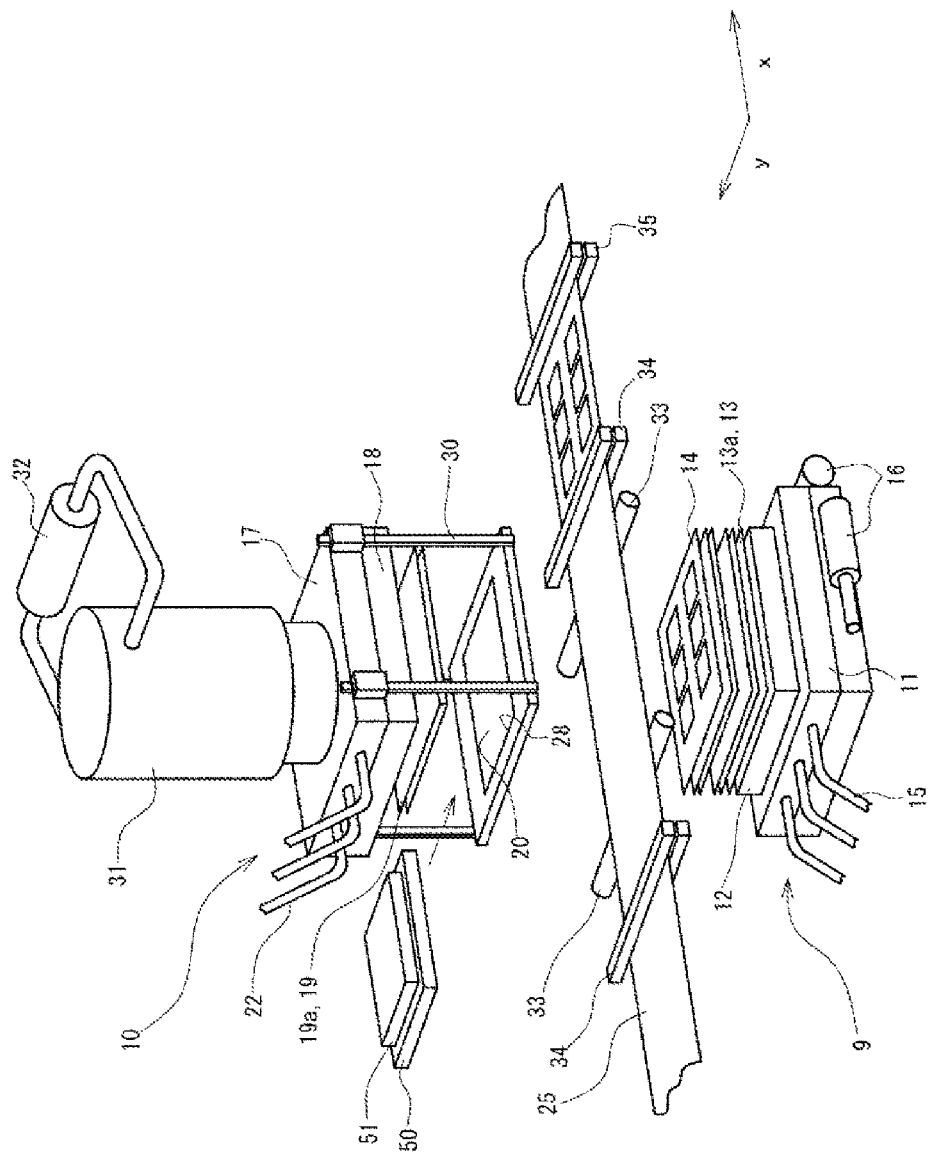
FIG. 6 is a schematic perspective view illustrating a light guide plate molding device according to a second embodiment.

As illustrated in FIG. 6, instead of an air cooling method where the upper die transfer plate 20 takes in air from the air supply duct 36, the second embodiment adopts a direct cooling method wherein a cooling plate 50 is in direct contact with the upper die transfer plate 20

In other words, the cooling plate 50 is arranged to travel back and forth between the transfer molding region in the die, and a non-transfer molding region outside the die via a horizontal travel mechanism. An auxiliary insulating plate 51 is integrally formed on the upper surface of the cooling plate 50. The lower surface of the transfer plate above the cooling plate and insulating plate can come in contact with the upper surface of the resin sheet 25 while the transfer plate is held the retaining plate 21. The plates are arranged such that the lower surface of the cooling plate 50 can come in contact with the upper surface of the transfer plate. The cooling plate 50 uses a water-cooling system configured such that a liquid flows therethrough via pipes (not shown) to keep the outer surface of the cooling plate 50 at a fixed temperature (for example, at 20° C.). Note that the other configurations of the dies and the like are identical to the aforementioned first embodiment, thus the corresponding portions are given identical reference numerals and the descriptions thereof are omitted.

Figure 7A:
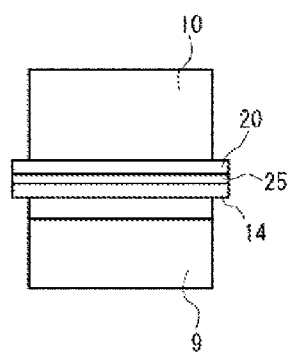
FIGS. 7A(a)-7A(f) are explanatory diagrams for illustrating the operations of each of the plates in the transfer molding device.
Figure 7A:
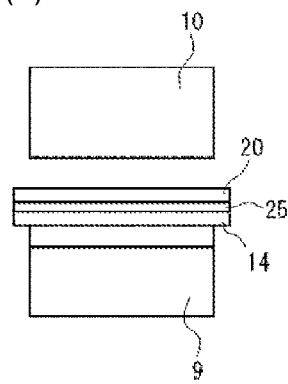
Figure 7A:
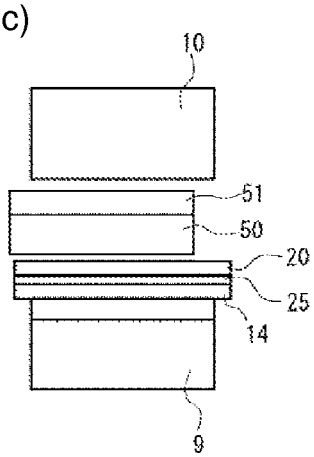
Figure 7A:
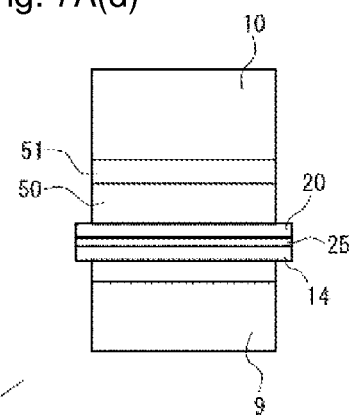
Figure 7A:
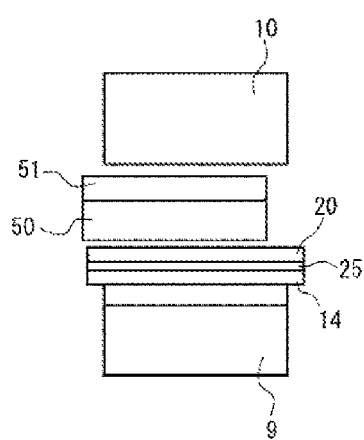
Figure 7A:
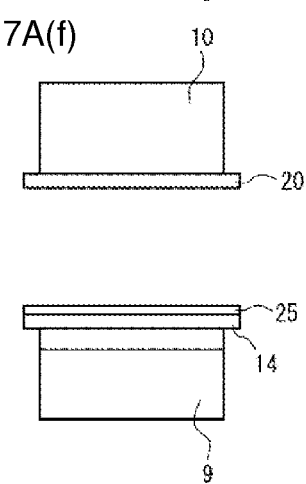

In the aforementioned configuration provided with the cooling plate 50, a heated and compressed resin sheet 25 is cooled in the following manner. Namely, when transitioning from the state illustrated in FIG. 7A(a) to the cooling step during the transfer molding process, as illustrated in FIG. 7A(b), the upper die 10 is raised while the upper die transfer plate 20 is in contact with the resin sheet 25. Thereafter, as illustrated in FIG. 7A(c), the cooling plate 50 is inserted laterally between the upper die transfer plate 20 and the upper die mediating plate 18.

First Cooling Step

Figure 8:
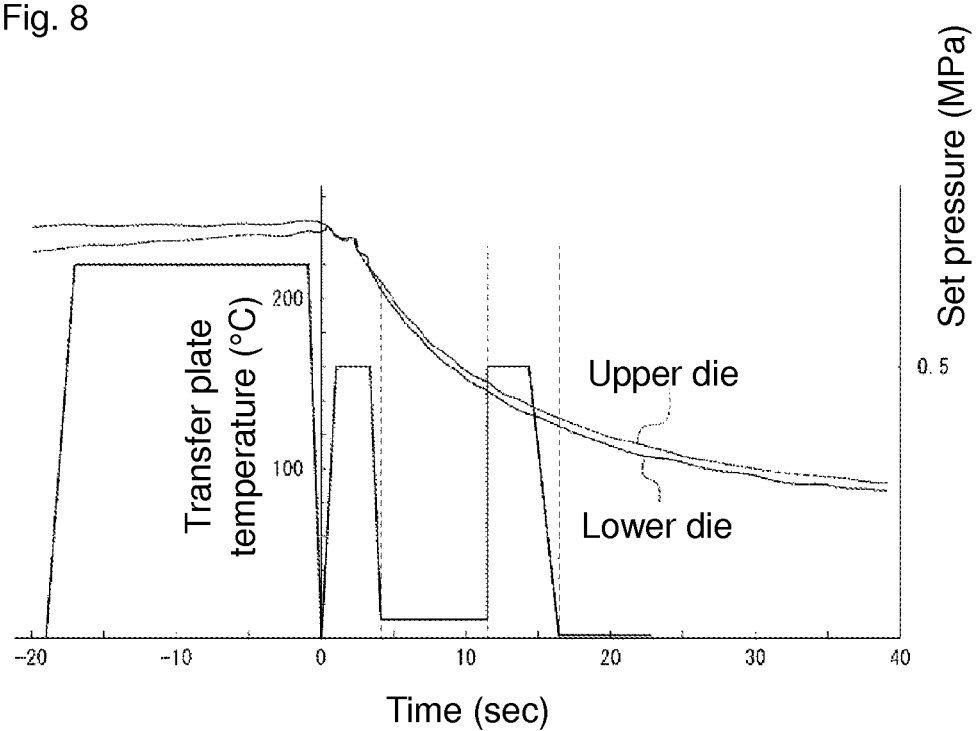
FIG. 8 is a graph for illustrating the relationship between the temperature and the applied pressure in the die of the transfer molding device in FIG. 6.

As illustrated in FIG. 7A(d), the upper surface of the upper die transfer plate 20 is placed in contact with the under surface of the cooling plate 50, and the cooling plate 50 and the auxiliary insulating plate 51 are clamped between the upper die transfer plate 20 and the upper die mediating plate 18. As illustrated in FIG. 8, a high pressure (lower than the pressure used during heating and compression) is applied at this time to remove air bubbles (voids) from the resin sheet 25. For example, given the combined gas law, a pressure of no less than 0.8 MPa is applied to reduce an air bubble that is a diameter of roughly 0.4 mm to a diameter of roughly 0.1 mm.

Second Cooling Step

Figure 7B:
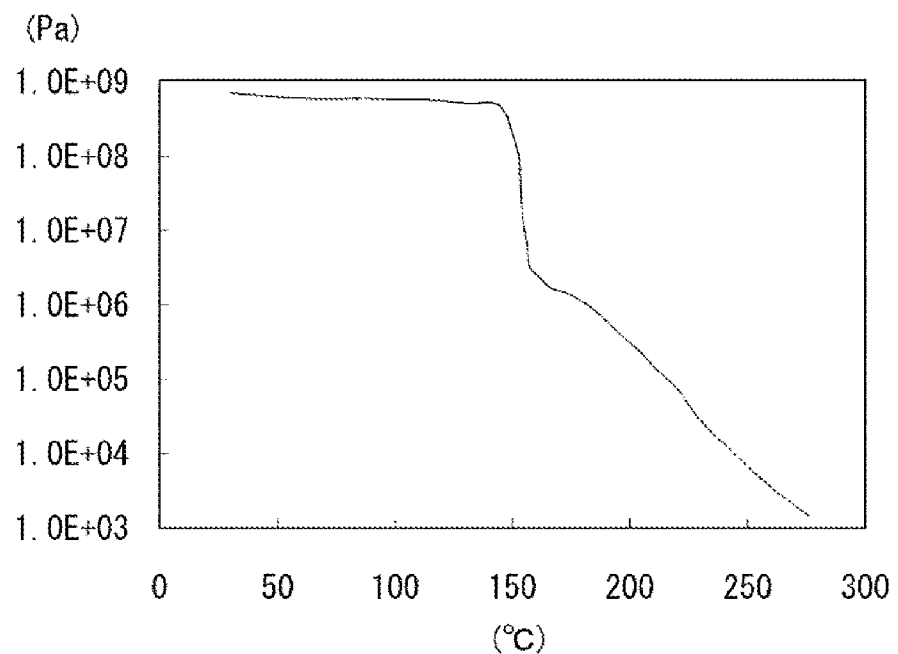
FIG. 7B(a) is a graph illustrating changes in the elasticity of a resin sheet 25 that accompany the temperature changes in the resin sheet.
Figure 7B:
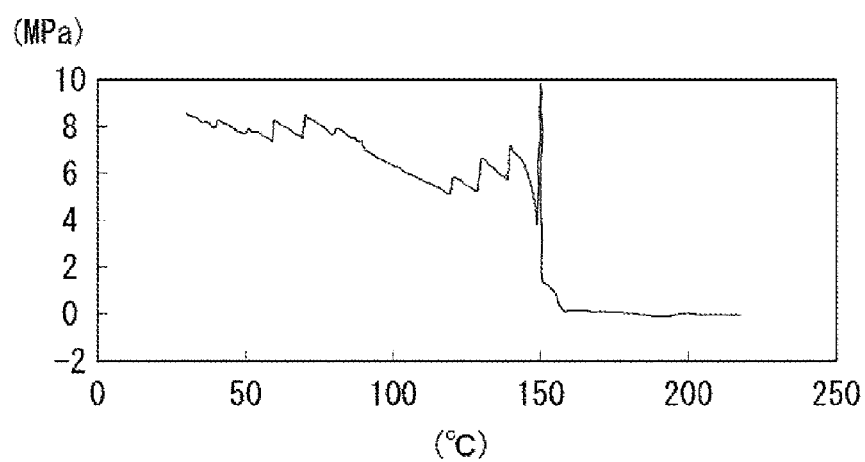

Next, when the temperature of the resin sheet 25 is reduced to below the boiling point thereof (for example, 200° C.; here, the reduction of the temperature is controlled based on time, and is at the point the first allotted time passes after the start of the first cooling step), the pressure applied is also reduced all at once (for example, the applied pressure is set to 0.1 MPa or greater). As illustrated in FIG. 7B (a), the elasticity of the resin sheets 25 increases with the reduction in temperature, and thus the resin sheet 25 tends not to elastically deform; thus, at the glass transition temperature of roughly 150° C. the resin sheet 25 solidifies and loses mobility. Therefore, as illustrated in FIG. 7B(b), when the temperature of the resin sheet 25 is reduced to roughly 150° C., a residual stress occurs when the dies are still applying pressure to the resin sheet 25 at that point. Realistically, the resin sheet 25 becomes a rubber-like elastic body at roughly 200° C. in which a residual stress occurs. Thus, in the second embodiment, the temperature of the resin sheet 25 is reduced to roughly 200° C., reducing the applied pressure to thereby remove the residual stress.

Third Cooling Step

Next, the temperature of the resin sheet 25 is further reduced to below the glass transition temperature (for example, 150° C.; here, the reduction of the temperature is controlled based on time and is the at point the second allotted time passes after the start of the second cooling step), the pressure applied is increased once again (for example, the applied pressure is set to 0.5 MPa or greater). Variations in the temperature distribution of the resin sheet 25 can be avoided because the resin sheet 25 is cooled from the upper surface. There are cases where the lower surface of the resin sheet 25 is not cooled to at or below the glass transition temperature at the point the upper surface thereof has already cooled to below the glass transition temperature and solidified. In this case, the lower surface, unable to keep up with upper surface that solidifies due to thermal contraction, rises into the center portion of the resin sheet 25 creating a bent camber. Despite that, raising the pressure applied, once again, can forcibly negate the contraction stress.

In this manner, the cooling time may be reduced by adopting the cooling method according to the second embodiment, compared to the cooling air cooling method used in the first embodiment. More specifically, a cooling time of 110 seconds using the air cooling method in the first embodiment can be reduced to 55 seconds with the direct cooling method used in the second embodiment. Further, in addition to arranging an insulating plate in the upper die 10 and the lower die 9 respectively, the auxiliary insulating plate 51 may be arranged on the upper surface of the cooling plate 50 to form a single unit. Therefore, the effect of the cooling plate on the upper die 10 may be controlled even when the cooling plate 50 is at a low temperature, reducing the travel time back and forth between the next heating and compression steps.

If the resin sheet 25 is cooled as above described, as illustrated in FIG. 7A(e), the upper die 10 is raised and the cooling plate 50 moved horizontally out-of-the-way. Additionally, as illustrated in FIG. 7A(f), a first cycle ends on raising the upper die transfer plate 20.

Third Embodiment

Figure 9A:
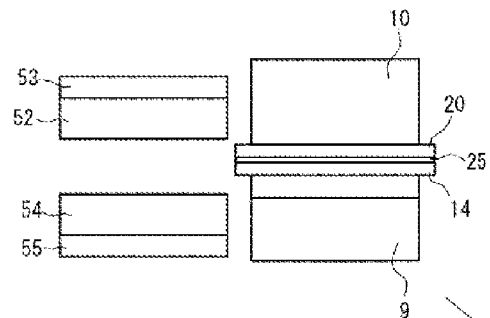
FIGS. 9(a)-9(d) are explanatory diagrams for illustrating the operations of each of the plates in the transfer molding device according to a third embodiment.
Figure 9B:
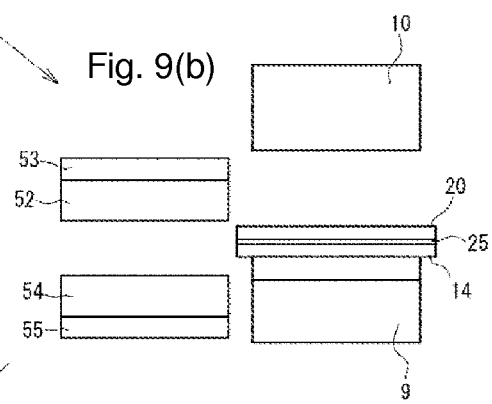
Figure 9C:
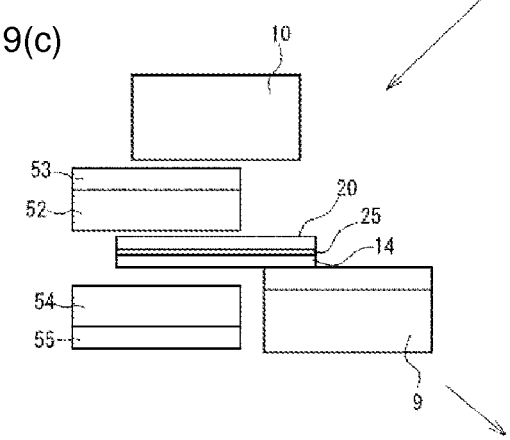
Figure 9D:
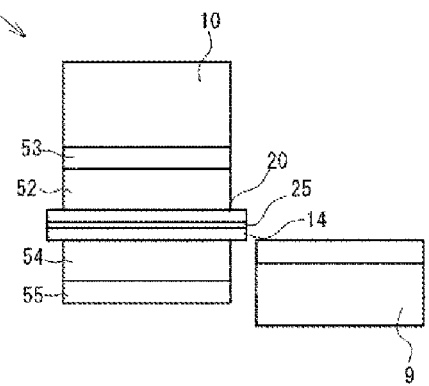
Figure 10A:
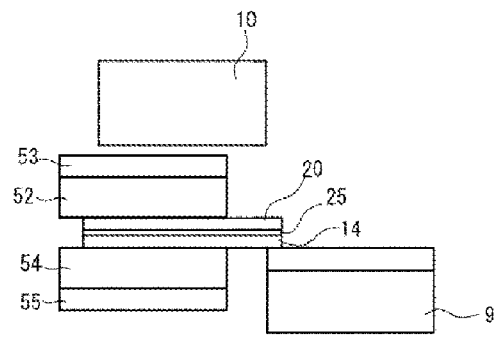
FIGS. 10(a)-10(c) are explanatory diagrams for illustrating the operations of each of the plates in the transfer molding device according to the third embodiment.

In the third embodiment, as illustrated in FIGS. 9(*a*)-9(*d*) and FIGS. 10(*a*)-(*c*), the transfer molding device is provided with a cooling mechanism that not only cools the resin sheet 25 from the upper surface toward the upper die transfer plates 20, but also pose a resin sheet from the lower surface toward the doors surface transfer plate 14.

Namely, the second embodiment is provided with a cooling plate 50 where an auxiliary insulating plate 51 is merely integrated with the upper surface thereof. However, the third embodiment is provided a first cooling plate 52 with an auxiliary insulating plate 53 integrated on the upper surface thereof, and a second cooling plate 54 with an auxiliary insulating plate 55 integrated on the lower surface thereof. Additionally, except for the lower die transfer plate 14, the entire lower die is now configured to move horizontally to a storage position. The first cooling plate 52 and the second cooling plate 54 are configured to be inserted above and below the resin sheet 25 with the upper surface in contact with the upper die transfer plate 20 and the lower surface in contact with the lower die transfer plate 14, while the first cooling plate 52 and the second cooling plate 54 are opposite each other in the vertical direction.

A transfer molding device 2 provided with a cooling mechanism having the aforementioned configuration operates as follows.

Namely, similarly to the first and second embodiments, once the preheating step and transfer molding process are complete as illustrated in FIG. 9(a), the upper die transfer plate 20 is placed and maintained in contact with the resin sheet 25 while the upper die 10 is raised as illustrated in FIG. 9(b). The lower die transfer plate 14 is then placed and maintained in contact with the resin sheet 25 as the other components of the lower die 9 are moved horizontally to the storage position as illustrated in FIG. 9(c). The upper die transfer plate 20 and the lower die transfer plate 14 which are arranged facing each other in the vertical direction also move horizontally, and are arranged above and below the resin sheet 25 in contact with the upper and lower surfaces thereof.

As illustrated in FIG. 9(d), the upper die 10 is lowered with the resin sheet 25 in this state, and the resin sheet 25 is clamped between the first cooling plate 52 and the second cooling plate 50 with the upper die transfer plate 20 and the lower die transfer plate 14 in contact with the upper and lower surfaces thereof. The cooling step begins with compressing the resin sheet.

In this manner, the top and bottom of the resin sheet 25 is equally cooled during the cooling step. Accordingly, there is no need deal with removing cambers via a first through third cooling step as carried out in the second embodiment. In other words, a half-finished plate 46 with no cambers can be produced with a single cooling step.

Figure 10B:
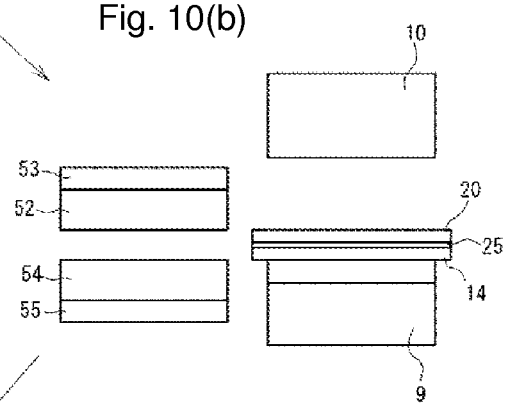
Figure 10C:
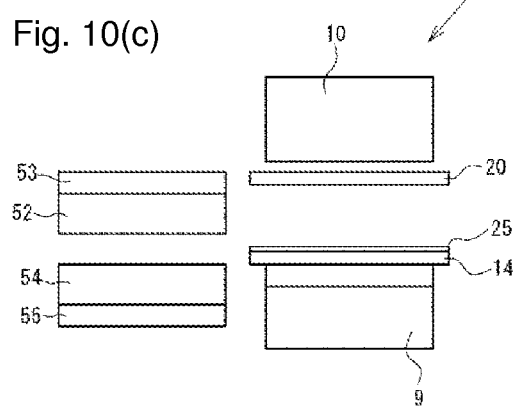

Subsequently, once the cooling step is complete, the first cooling plate 52 and second cooling plate 54, and the components in the lower die 9 except for the lower die transfer plate 14 are moved horizontally and returned to the original position. Further, as illustrated in FIG. 10(b), once the resin sheet 25, with upper die transfer plate 20 and the lower die transfer plate 14 in contact with the upper and lower surfaces thereof is placed on top of the lower die 9, the upper die transfer plate 20 is raised as illustrated in FIG. 10(c), and one cycle ends.

Other Embodiments

The present invention is not limited to the configurations of the embodiments described above, and may be modified in various ways.

For instance, in one or more of the aforementioned embodiments, the thick portion is created by melting the resin sheet 25, and flowing a portion of the melted resin into a recess site 23 created in the upper die transfer plate 20; however, the thick portion 26 may also be created as follows.

In FIG. 11A(a), primarily the non-product portion (the portions except the region that becomes the light guide plate) of the melted resin sheet 25 is flowed into the recess site 23. That is, the side wall 20a towards the non-product portion making up the recess site 23 formed on the upper die transfer plate 20 is configured with a larger height than the other portions of the upper die transfer plate 20. Additionally, the inner surface 20b created by the sidewall 20a gradually opens from the bottom surface of the recess site 23 and is configured by a slanted surface 20b.

Hereby, when the dies are brought to and compress the resin sheet during transfer molding as illustrated in FIG. 11A(b), the melted non-product portion of the resin flows onto the slanted surface 20b of the sidewall 20a and enters the recess site 23, as illustrated in FIG. 11A(c). Subsequently, a portion of the product portion of the resin flows onto the other slanted surface 20c on the opposite side of the sidewall 20a and enters the recessed sites 23. In this case, the inflow rate of the melted resin from the non-product portion is sufficiently large because of the large protruding height of the sidewall 20a. Consequently, this reduces the amount of resin that is cut, and thereby reducing production cost. As a result, the recess site 23 is filled with the melted resin as illustrated in FIG. 11A(d). The cooling step and the like beyond this point is identical to the steps in the previously described embodiments, and thus an explanation thereof is omitted.

In FIGS. 11B(a)-11B(b), instead of melting the resin sheet 25 and flowing a portion of the melted resin into the recess site 23, an additional material (for instance, a resin piece 25a) is placed separately in the recess site 23 in the upper die transfer plate 20. Therefore, as illustrated in FIG. 11B(b), the thick portion may be easily and effortlessly created.

In FIG. 11C(a) a protruding portion 25b is created in advance in a portion of the resin sheet 25, and thereby, the additional material is integrally provided in the resin sheet 25 in advance. The protruding portion 25b may be thinner than the thick portion 26 and, according to one or more embodiments of the present invention, is thicker than the pre-molded resin sheet. In this manner, there is no need for a separate mechanism supplying the additional material when the protruding portion 25b is provided as a part of the configuration, thereby improving production performance.

Additionally, while in one or more of the previously described embodiments, the recess site 23 is formed in the upper die transfer plate 20, the recess site 23 could also be provided in the lower die transfer plate 14, or in both transfer plates.

In one or more of the previously described embodiments, the die structure is configured from the upper and lower dies 9, 10; however, for instance, dies that open and close horizontally may also be adopted.

In one or more of the previously described embodiments, the transfer surface is formed in the upper die transfer plate 20 and the lower die transfer plate 14 respectively; however, the transfer surface may be formed in either one of the transfer plates. These transfer plates may be omitted and the transfer surface directly formed in the dies (for example, in the mediating plates).

Additionally, in one or more of the previous embodiments, the entire surface of the upper die transfer plate 20 is equally heated; however, the entire surface may not necessarily be equally heated. For instance, the dies may be configured such that the heating is focused near the recess site 23. Therefore, the resin inside the recess site 23 may be kept in a favorable melted state, allowing the creation of a favorable thick portion 26 having no sinks or the like.

In one or more of the previously described embodiments, the resin sheet 25 is heated and compressed while clamped between the upper die transfer plate 20 and the lower die transfer plate 14, and the entire resin sheet 25 is melted. For that reason, according to one or more embodiments of the present invention, at least one of the transfer plates 14, 20 should include a flow regulating structure that controls the flow of melted resin at the edges.

A flow regulating structure is formed on the upper surface edges of the lower die transfer plate 14 in FIG. 11D(a)-11D (d). However, there is no need to form the flow regulating structure surrounding the four sides of the transfer plate. As long as the flowing resin does not flow into the surrounding area, the flow regulating structure may be provided periodically, or provided on only two sides.

FIG. 11D(a) illustrates a flow regulating structure configured by a protruding portion 14a protruding from the upper surface of the lower die transfer plate 14. FIG. 11D(b) illustrates a flow regulating structure configured by a groove 14b formed in the upper surface of the lower die transfer plate 14. FIG. 11D(c) illustrates a flow regulating structure configured by a plurality of fine protrusions 14c protruding from the upper surface of the lower die transfer plate 14. FIG. 11D(d) illustrates a flow regulating structure configured by a plurality of fine recesses 14d protruding from the upper surface of the lower die transfer plate 14. The flow regulating structures having these configurations may also be created in the upper die transfer plate 20, or may be created in both transfer plates 14, 20. Finally, without being limited to these configurations, any form may be used, so long as the configuration increases the flow resistance of the melted resin.

In one or more of the previously described embodiments, the pressure applied during the cooling step is determined as illustrated in FIG. 8, however the applied pressure may also be determined as follows.

For example, in the first cooling step, to shrink an air bubble from a diameter of 0.4 mm to a diameter of 0.1 mm, the pressure applied $P_1$ is determined according to the combined gas law (where PV/T=a constant).

$$P_0 \times V_0/T_0 = P_1 \times V_1/T_1 \qquad (1)$$

The following values are substituted into Formula (1).
$P_0$=101325 Pa (Atmospheric Pressure)
$V_0$=3.35×10$^{-11}$ m$^3$ (Air Bubble Volume of 0.4 mm in diameter)
$T_0$=240° C.=513 K
$V_1$=5.23×10$^{-13}$ m$^3$ (Air Bubble Volume of 0.1 mm in diameter)
$T_1$=190° C.=463 K
From the above, $P_1$=5.85 MPa.

Therefore, if the applied pressure is greater than or equal to 5.85 MPa, an air bubble 0.4 mm in diameter will shrink to less than 0.1 mm in diameter.

In addition, in the second cooling step, the temperature of the resin sheet 25 (polycarbonate) is reduced to 190° C., to reduce the pressure applied to 0.02 MPa (or, to no pressure, 0 MPa). Thus, the residual stress can be eliminated.

Moreover, in the third cooling step, the pressure corresponding to the contraction stress generated when the temperature of the resin sheet 25 (polycarbonate) is reduced from the glass transition temperature of 150° C. to a temperature of 130° C. where the resin sheet can be separated from the dies is determined as the pressure applied $P_2$.

That is, $P_2$=E×α, where
E (Elastic Modulus)=2.45 GPa
α (Linear Expansion Coefficient for Polycarbonates)=7×10$^{-5}$ Accordingly, $P_2$=3.4 MPa. Pressure applied at or above this value (for instance, at 6.2 MPa) can prevent deformities due to the contraction stress accompanying the cooling of the resin sheet 25.

In one or more of the previously described embodiments, the preparation, transfer molding, film adherence, and cutting processes are carried out continuously in a series of devices arranged in parallel; however, each of the processes may be carried out separately, or a portion of the processes may be carried out continuously. In other words, these series of processes may be carried out continuously or discretely so long as the processes are carried out in order. Each of the steps during the transfer molding processes may each be carried out separately, or a portion of the processes may be carried out continuously.

In one or more of the previously described embodiments, the maximum height of the recesses and projections formed on the transfer surface is in submicrons, while the protrusion of the thick portion is in the submillimeter range. However, without being limited to this, for instance, the maximum height of the recesses and projections may be in microns (200 μm, for example), while the protrusion of the thick portion is in millimeters (1 mm, for example). In other words, the thick portion 26 may protrude at a height greater than the maximum height of the recesses and projections. In particular, the thick portion 26 may protrude at a height that is no less than ten times the maximum height of the recesses and projections. When the thick portion 26 protrudes at a height that is not less than ten times the maximum height of the recesses and projections, the thick portion may be in microns.

One or more of the previous embodiments exemplified the use of a continuous belt-like resin sheet 25; however, the transfer molding device may be configured for transfer molding in a single sheet (or a plurality of sheets of two or more) of half-finished plates 46 into discrete strips. In this case, for instance, a vertically rotatable roller and the like may be disposed, to thereby enable transporting the resin sheet 25, even when the resin sheet 25 is a strip.

One or more of the previously described embodiments provide an example of producing a light guide plate using a transfer molding method; however, without being limited to this, the transfer molding method may be used to produce a wide variety of optical components, such as prismatic sheets, and the like.

Figure 11F:
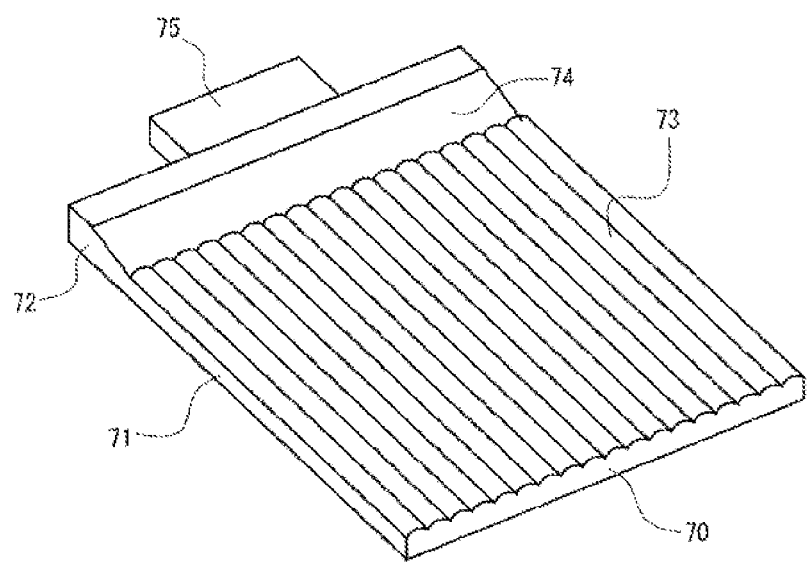
FIG. 11F is a perspective view of a surface illumination device adopting a light guide plate according to another embodiment.

In one or more of the previously described embodiments, the light guide plate is adopted in a liquid crystal display device configured as illustrated in FIG. 11E; however, for instance, the configuration of the light guide plate may be modified and the light guide plate adopted in the surface illumination device illustrated in FIG. 11F.

Namely, the light guide plate 70 illustrated in FIG. 11F is configured from a main light guiding body 71 having a substantially uniform thickness, and a wedge-shaped light conducting portion 72. A polarization pattern or diffusion pattern is formed on the back surface of the main light guiding body 71, while a lenticular lens with half-circle cross-sections is formed on the front surface. Further, a slanted surface 74 in the light conducting portion 72, slanting from the light conducting portion 72 toward the main light guiding body 71. Finally, the end surface (light input surface) of the light conducting portion 72 is thicker than the height of the light source 75.

In a surface illumination device adopting a light guide plate having the aforementioned configuration, the end surface of the light conducting portion 72 may be made thicker than the height of the light source 75. Therefore, light output from the light source 75 may be efficiently introduced at the light conducting portion 72. Additionally, the light introduced at the light conducting portion 72 is guided toward the main light guiding body 71 spreading in planar form, and is reflected by the polarization pattern or the diffusion pattern to be output externally from the light output surface of the main light guiding body 71. At this point, the light output from the light output surface has a wide directivity due to the lenticular lens 73.

In this manner, the surface illumination device having the aforementioned configuration is capable of both improving the efficiency of using light from the light source 75, and having a thin profile.

The aforementioned light guide plate 70 includes a lenticular lens 73 with half-circular cross sections formed on the front surface of the main light guiding body 71. However, the light guide may have another configuration with another cross-sectional shape thereon such as a prismatic sheet and the like having a triangular cross-section.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

The invention claimed is:

1. A transfer molding method comprising:
    transporting a resin sheet between a first die and a second die arranged facing each other where at least one of the first and second dies facing each other includes a surface that is a transfer surface with recesses and projections;
    clamping the resin sheet between the first and second dies with the transfer surface in contact with at least one surface of the resin sheet; and
    a transfer molding step, comprising;
        applying heat to at least one of the first and second dies to transfer the transfer surface onto the at least one surface of the resin sheet,
        forming a large thick portion protruding at a height greater than the maximum height of recesses and projections on the transfer surface using a recess site formed in at least one of the first and second dies, and
        bringing the first and second dies near a position that reduces the thickness of all portions on the molded resin sheet other than the thick portion to less than the initial thickness thereof.

2. The transfer molding method according to claim 1, wherein the height of the thick portion on the molded resin sheet is no less than ten times the maximum height of the recesses and projections on the surface molded using the transfer surface in the transfer molding step.

3. The transfer molding method according to claim 1, wherein the resin sheet is heated to no less than a glass transition temperature in the transfer molding step.

4. The transfer molding method according to claim 1, wherein the resin sheet is melted and flowed towards the recess site formed in at least one of the first and second dies to create the thick portion in the transfer molding step.

5. The transfer molding method according to claim 4, wherein the resin flowed into the recess site formed in at least one of the first and second dies is resin from the outer surface of the melted resin sheet.

6. The transfer molding method according to claim 4, wherein the resin flowing into the recess site formed in at least one of the first and second dies is obtained from a region of the resin sheet adjacent to a region facing the recess site.

7. The transfer molding method according to claim 1, wherein an additional material is disposed within the recess site in the transfer molding step and melted along with at least a portion of the resin sheet to form the thick portion.

8. The transfer molding method according to claim 1,
    wherein the resin sheet includes at least a protruding portion on at least one part thereof; and
    wherein an additional material may be disposed within the recess site in the transfer molding step and melted along with at least a portion of the resin sheet to form the thick portion.

* * * * *